235-379 SR

6/23/87 OR 4,675,514

United States Patent [19]

Honma et al.

[11] Patent Number: 4,675,514

[45] Date of Patent: Jun. 23, 1987

[54] APPARATUS FOR ARRANGING THE OBVERSE AND REVERSE SIDES OF BILLS OR THE LIKE

[75] Inventors: Nobuyuki Honma, Matsudo; Takashi Shinozaki, Kawaguchi, both of Japan

[73] Assignee: Laurel Bank Machines Co., Ltd., Tokyo, Japan

[21] Appl. No.: 800,402

[22] Filed: Nov. 21, 1985

[30] Foreign Application Priority Data

Dec. 22, 1984 [JP] Japan .......................... 59-194889[U]

[51] Int. Cl.[4] .............................................. G06F 15/30

[52] U.S. Cl. .................................... 235/379; 235/375

[58] Field of Search ........................................ 235/379

[56] References Cited

U.S. PATENT DOCUMENTS 4,511,974 4/1985 Impmichi ............................ 235/379

*Primary Examiner*—Harold I. Pitts

*Attorney, Agent, or Firm*—Fleit, Jacobson, Cohn & Price

[57] ABSTRACT

There is provided an apparatus for arranging the obverse and reverse sides of bills. The apparatus comprises a carrying-in passage, a rear conveying passage, a front conveying passage, and an accumulating wheel. The rear conveying passage and front conveying passage are divided from the carrying-in passage, and respectively lead to the accumulating wheel. The front conveying passage includes an inverting/conveying passage for inverting the leading end of the bill. Consequently the bills are accumulated in a box through the accumulating wheel so with their obverse sides or reverse sides up.

1 Claim, 3 Drawing Figures

APPARATUS FOR ARRANGING THE OBVERSE AND REVERSE SIDES OF BILLS OR THE LIKE

BACKGROUND OF THE INVENTION

This invention relates to an apparatus for arranging the obverse and reverse sides of bills or the like which is used as an internal mechanism of bill handling machines such as bill depositing and dispensing machines and bill arranging machines.

Conventionally, a mechanism such as shown in FIGS. 2 and 3 (Japanese Patent Laid-Open Publication No. 75392/1982) is known as an apparatus for arranging the obverse and reverse sides of bills or the like.

This conventional apparatus is arranged as follows: After passing a discriminating section 1, bills Pa with their obverse and reverse sides in an arbitrarily mixed state are given an operating timing by a first sensor 2. The bills are then guided by a first gate fork 3 for maintaining the status shown in FIG. 2, are conveyed to conveyor belts 4 and 5, and are distributed in two directions by means of a second gate fork 7, i.e., a distributing device, which operates on the basis of the results of the discrimination of the obverse and reverse sides obtained in the discriminating section 1.

For instance, in a case where a bill is judged to be in the obverse state, the second gate fork 7 rotates counterclockwise as viewed in the drawing from the state shown in the drawing. The bill is then conveyed by the conveyor belts 5 and 13 and is fed in between blades **9*a* of an accumulating wheel 9**.

On the other hand, in a case where a bill is judged to be in the reverse state, the second gate fork 7 maintains the state shown in the drawing, and the bill is fed in between the conveyor belts 4 and 8. After the bill is conveyed by the conveyor belts 4 and 8 and is temporarily fed into a conveying-direction inverting mechanism 10, the bill is fed out again in between conveyor belts 8 and 11. The bill is then conveyed by the conveyor belts 8 and 11 and is fed in between the blades **9*a* of the accumulating wheel 9**.

Bills or the like which are fed in between the blades **9*a* of the accumulating wheel 9 with their sides arranged in the obverse state are caused to drop into and accumulate in a container 12 immediately below the accumulating wheel 9 as the accumulating wheel 9** rotates.

To describe in detail the conveying-direction inverting mechanism 10, this mechanism is arranged such that a roller 14 having a multiplicity of projections around the periphery thereof apart from the position of a pulley **8*a*, as shown in FIG. 3, is provided on the shaft 8*b* of the pulley 8*a* round which the conveying belt 8 is wound. The rear end of the bill or the like fed into the conveying-direction inverting mechanism 10 by means of the conveyor belts 4 and 8 is pulled downwardly by a projection on the periphery of the roller 14 and assumes the state of Pc shown by a broken line in the FIG. 3. Then, the bill is fed in between the conveyor belts 8 and 11 with the rear end facing the forward direction and is fed out into the accumulating wheel by means of the conveyor belts 8 and 11**. In other words, inversion of the conveying direction is effected.

In the aforementioned conventional apparatus for arranging the obverse and reverse sides, since the conveying-direction inverting mechanism 10 provided on one branch of the conveying passage which branches out into two temporarily sets the bill or the like in a free state (an unclamped state) before feeding the same into the accumulating wheel 9, the inverting operation at this conveying-direction invertinhg mechanism 10 is not positively carried out. Additionally, the time required for the inverting operation is uncertain and is not fixed. As a result, there are cases where there occur such malfunctions as the feeding out of a bill not being carried out smoothly and the timing of the feeding out being delayed. Consequently, there are cases where bills or the like are damaged, bills or the like from two conveying passages for those in the obverse and reverse states are double fed into the same blades of the accumulating car, or succeeding bills or the like are double fed onto the conveying passage on the inverting side. The aforementioned malfunctions appear even more noticeably in the case of bills which are not rigid.

In addition, in the case of handling a fixed number of bills or the like, a difference occurs in handling time depending on the proportions of the obverse and reverse sides of the fixed number thereof.

SUMMARY OF THE INVENTION

It is, therefore, an object of this invention to provide an apparatus for arranging the obverse and reverse sides of bills or the like wherein the inversion of a reversed bill can be positively made and the bill thus inverted can be fed in between two predetermined blades of the accumulating wheel without fail.

In accordance with the present invention, there is provided an apparatus for arranging the obverse and reverse sides of bills and which comprises: a carrying-in passage for carrying in bills with their obverse and reverse sides in the mixed state; an accumulating wheel having a plurality of blades on the peripheral portion thereof so as to feed out sent-in bills by rotating while accommodating the same in between the blades; a rear conveying passage as viewed in the rotating direction of the accumulating wheel which communicates with the rear portion, as viewed in the rotating direction of the accumulating wheel, of the accumulating wheel from the outlet of the carrying-in passage; a front conveying passage as viewed in the rotating direction of the accumulating wheel which is communicated with the front portion, as viewed in the rotating direction, of the periphery of the accumulating wheel from the same outlet as that of the carrying-in passage; and a distributing device located in the vicinity of the outlet of the carrying-in passage so as to distribute bills from the carrying-in passage into the rear conveying passage as viewed in the rotating direction of the accumulating wheel and the front conveying passage as viewed in the rotating direction of the accumulating wheel depending on the condition of their obverse and reverse sides, the front conveying passage as viewed in the rotating direction of the accumulating wheel being formed by: a front-stage conveying passage communicating with the outlet of the carrying-in passage; an inverting/conveying passage formed by a pair of reversibly rotating conveyors so as to carry out bills or from the front-stage conveying passage through a carrying-in/out port after once receiving the same from the carrying-in/out port and returning the same; and a rear-stage conveying passage one end of which faces the carrying-in/out port of the inverting/conveying passage and the other end of which faces the front portion of the accumulating wheel as viewed in the rotating direction thereof.

For instance, a bill or the like in the obverse state is guided onto the rear conveying passage of the accumulating wheel as viewed from the rotating direction thereof, is conveyed by this rear conveying passage of the accumulating wheel as viewed from the rotating direction thereof, is fed in between the blades of the rear portion of the accumulating wheel in the rotating direction thereof, and is then fed out into a container or the like from the accumulating wheel.

In addition, a bill or the like in the reverse state is guided onto the front-stage conveying passage of the front conveying passage of the accumulating wheel as viewed in the rotating direction thereof, and is temporarily carried into the inverting conveying passage through its carrying-in port from this front-stage conveying passage. Subsequently, as this inverting conveying passage is inverted, the bill or the like is delivered from the carrying-in port with its rear end facing forward, is conveyed along the rear-stage conveying passage in that state, is fed in between the blades of the front portion of the accumulating wheel is viewed in the rotating direction thereof, and is fed out into the container or the like from the accumulating wheel. Thus, bills or the like with their obverse and reverse sides in the mixed state are rearranged.

DESCRIPTION OF THE DRAWINGS

The present invention will now be described in detail with reference to the preferred enbodiment illustrated in the accompanying drawings in which.

DESCRIPTION OF THE PREFERRED EMBODIMENT

Figure 1:
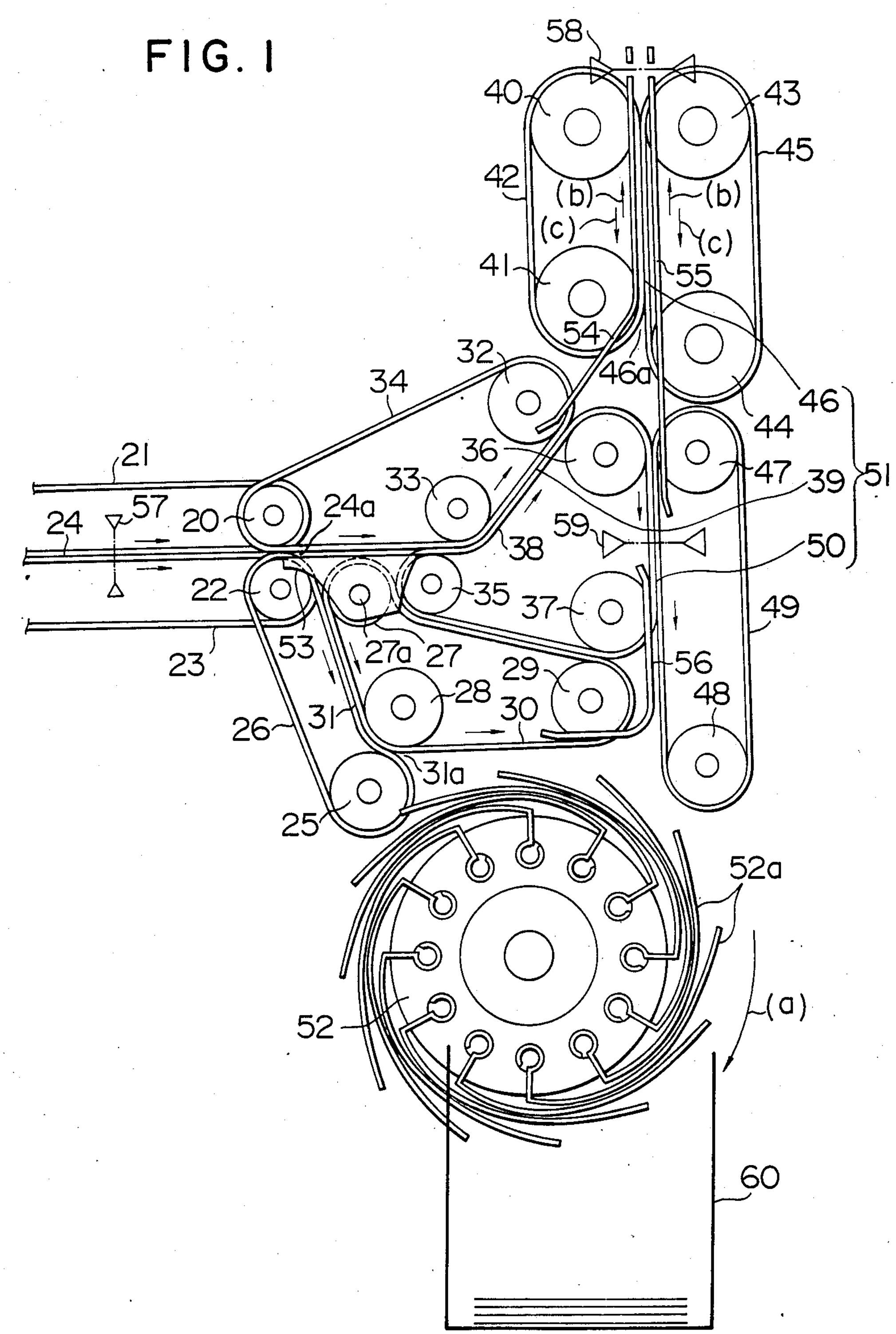
FIG. 1 is a schematic drawing of an apparatus for arranging the obverse and reverse sides of bills or the like illustrating an embodiment of the present invention.
Figure 2:
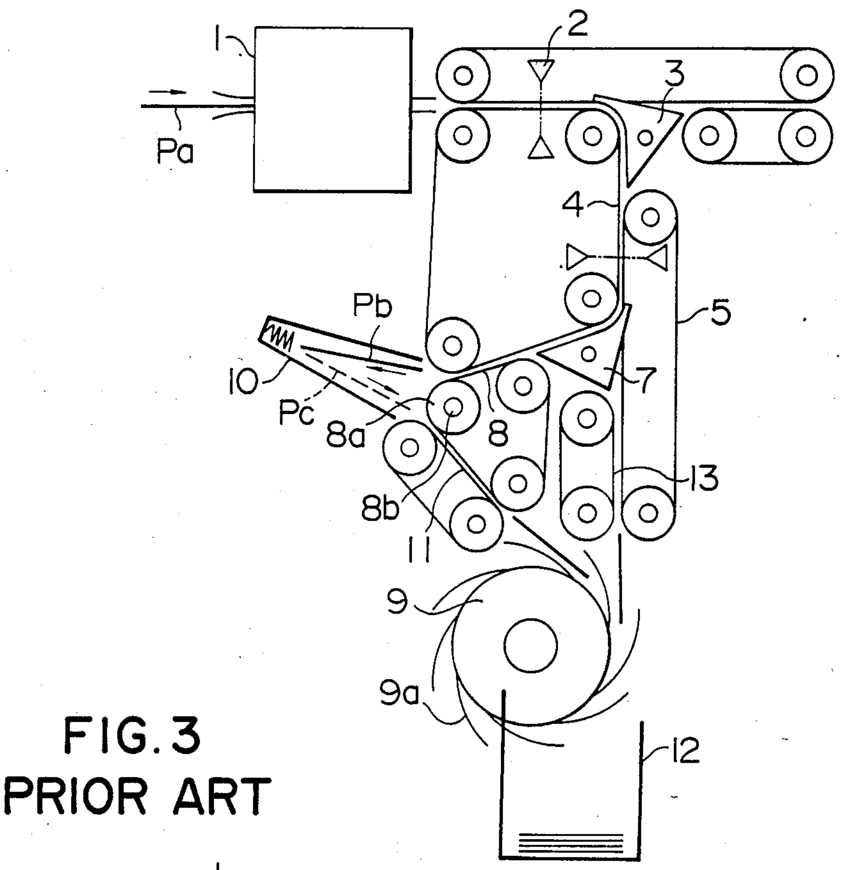
FIG. 2 PRIOR ART
FIG. 2 is a schematic drawing illustrating a conventional example.
Figure 3:
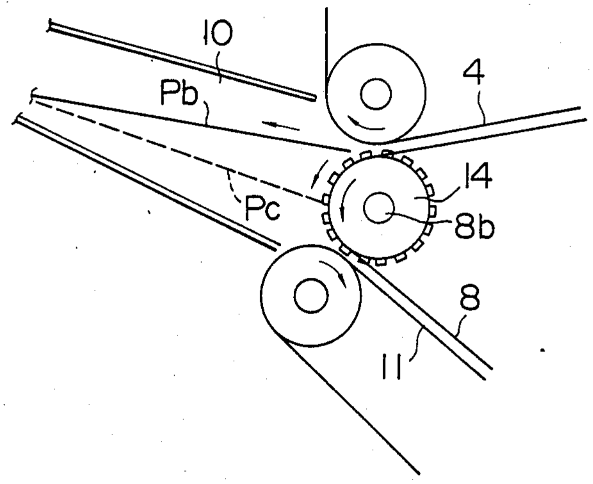
FIG. 3 PRIOR ART
FIG. 3 is an enlarged view of an essential part shown if FIG. 2.

The present invention will now be described in detail by referring to the embodiment shown in the accompanying drawings with reference to FIG. 1, an apparatus for arranging the obverse and reverse sides of bills comprises the following five passages: (1) a carrying-in passage 24 formed by a carrying-in belt 21 wound round a roller 20 and a carrying-in belt 23 wound round a roller 22; (2) a rear conveying passage 31 of the accumulating wheel as viewed in the rotating direction thereof formed by a first conveyor belt 26 trained between the roller 22 and a roller 25 and a second conveyor belt 30 wound round rollers 27, 28 and 29 to come into contact with the righthand side of the first conveyor belt 26 as viewed in FIG. 1; (3) a front-stage conveying passage 39 formed by a third conveyor belt 34 wound round the roller 20 and rollers 32 and 33 and a fourth conveyor belt 38 wound round rollers 35, 36 and 37 and which is communicated with the outlet 24*a* of the carying-in passage 24; (4) an inverting/conveying passagė 46 which is formed by a reversibly conveying belt 42 (i.e., a reversibly rotating conveyor) wound round reversible rollers 40, 41 and a reversibly conveying belt 45 (i.e., a reversibly rotating conveyor) wound round reversible rollers 43, 44 and whose carrying-in/out port 46*a* is communicated with the front-stage conveying passage 39, and (5) a rear-stage conveying passage 50 formed by a fifth conveyor belt 49 wound round rollers 47 and 48 and the fourth conveyor belt 38 and whose upper end faces the carrying-in/out port 46*a* of the inverting/conveying passage 46. The front-stage conveying passage 39, inverting/conveying passage 46, and rear-stage conveying passage 50 form a front conveying passage as viewed in the rotating direction of the accumulating wheel, and the lower end of the rear-stage conveying passage faces the front portion of the accumulating wheel having a multiplicity of blades 52*a* as viewed in the rotating direction thereof (arrow (a)). Furthermore, the outlet 31*a* of the rear conveying passage 31 in the rotating direction of the accumulating wheel faces the rear portion of the accumulating wheel 52 in the rotating direction thereof. In addition, a rotatable gate fork 53 (i.e., a distributing device) for distributing bills from the carrying-in passage 24 into the rear conveying passage 31 in the rotating direction of the accumulating wheel and the front-stage conveying passage 39 of the front conveying passage 51 in the rotating direction of the accumulating wheel is pivotally supported by the shaft 27*a* of the roller 27 in the vicinity of the outlet 24*a* of the carrying-in passage 24. Additionally, guide plates 54, 55 are provided at a portion of the inverting/conveying passage 46, and a guide plate 56 is provided at a portion of the rear-stage conveying passage 50. Moreover, photo-sensors 57, 58 and 59 for detecting the passage of bills are respectively provided at the carrying-in passage 24, the upper end of the inverting/conveying passage 46, and the rear-stage conveying passage 50, as will be described later.

Next, description will be made of the operation.

Bills with their obverse and reverse sides in the mixed state are conveyed along the carrying-in passage 24 from the lefthand side as viewed in FIG. 1 while maintaining desired conveying intervals between each other, and are detected by the photo-sensor 57.

The space between the blades 52*a* of the accumulating wheel 52 into which the detected bill is to be subsequently inserted is determined by a timing detected by this photosensor 57.

More particularly, whether the detected bill is transferred through the rear conveying passage 31 into the accumulating wheel or through the front conveying passage formed by the passages 39, 46 and 50, as described is detail later, the delected bill can enter the space between the blades as determined by the timing detected by the photosensor 57. This is because the time from the transfer of the bill through the rear conveying passage 31 to the space between the blades of the accumulating wheel and for the space to reach the position just below the rear-stage conveying passage 50 is substantially equal to the time taken for the bill transferred through the front conveying passage and through the rear-stage conveying passage 50 to enter the space between the blades.

Then, in accordance with the results of discrimination of the obverse or reverse side carried out by a discriminating section (not shown), in the case of a bill in the obverse state, for instance, the gate fork 53 is inclined clockwise as viewed in FIG. 1, and the bill in the obverse state is guided to the side of the rear conveying passage 31 in the rotating direction of the accumulating wheel. The bill is then clamped and conveyed by the first and second conveying belts 26, 30 theerof, is fed into the space formed between the blades 52*a* in the rear portion of the accumulating wheel as viewed in the rotating direction thereof from the outlet 31a facing the circumferentially tangential direction of the accumulating wheel 52, and is fed out into a lower container box 60 in conjunction with the rotation of the accumulating wheel 52 so as to be accumulated.

In the case of a bill in the reverse state, on the other hand, the gate fork 53 returns to the state as shown in FIG. 1, is guided by the front-stage conveyor passage 39 of the front conveying passage 51 as viewed in the rotating direction of the accumulating wheel, and is then clamped and conveyed by the third and fourth conveyor belts 34, 38 thereof. Subsequently, the bill is fed into the inverting/conveying passage 46 between the reversibly conveying belts 42, 45 rotating in the direction of the arrow (b) in FIG. 1 from the carrying-in/out port 46a through the guide plates 54, 55. When the bill fed temporarily onto this inverting/conveying passage 46 advances and its end is detected by the photo-sensor 58, a timing at which the bill extricates itself from a clamp between the fourth conveyor belts 34, 38 is detected by this detection, which in turn causes the reversible rollers 40, 41 43 and 44 to rotate backwardly so as to change the rotation of the reversibility conveying belts 42, 45 to the opposite direction (the direction of the arrow (c)). Consequently, the bill moves backwardly and is conveyed again from the carrying-in/out port 46a with its rear end facing forward, and is then fed onto the rear-stage conveying passage 50 located immediately therebelow and comprising the fourth and fifth conveyor belts 38, 49. The bill conveyed along the rear-stage conveying passage 50 by means of the fourth and fifth conveyor belts 38, 49 is fed into the space formed between the blades 52a in the front portion, as viewed in the rotating direction of the accumulating wheel 52, of said accumulating wheel 52 rotating clockwise (the arrow (a)) in FIG. 1 through the guide plate 56, and is fed out into the container box 60 from the accumulating wheel 52 in conjunction with its rotation so as to be accumulated therein.

As described above, the obverse and reverse sides of bills in the reverse state fed into the space between the blades 52*a* of the accumulating wheel 52 with their front and rear sides inverted after passing through the inverting/conveying passage 46 are properly arranged to conform with those of bills fed into the space between the blades 52*a* of the accumulating wheel 52 after passing through the rear conveying passage 31 as viewed in the rotating direction of the accumulating wheel.

When a bill fed onto the rear-stage conveying passage 50 from the inverting conveying passage 46 is detected by the photo-sensor 59 provided at this rear-stage conveying passage 50, a timing at which the bill extricates itself from a clamp between the reversibly conveying belts 42, 45 is detected on the basis of this detection, which in turn causes the reversible rollers 40, 41, 43 and 44 to resume their forward rotation. Consequently, the rotation of the reversibly conveying belts 42, 45 is changed over to forward rotation in the direction of the arrow (b), thereby getting ready for the next bill to be carried in.

In the embodiment, the respective conveying passages of the carrying-in passage 24, the rear conveying passage 31 as viewed in the rotating direction of the accumulating wheel, the front-stage conveying passage 39, the inverting/conveying passage 46, and the rear-stage conveying passage are formed by belts, but it is also possible to form the conveying passages by disposing a plurality of rollers.

In addition, it is also possible to arrange the inverting-/conveying passage such as to be disposed on the side of the rear conveying passage as viewed in the rotating direction of the accumulating wheel.

As described above, the present invention is arranged such that bills or the like are conveyed after being distributed from the carrying-in passage into the rear conveying passage as viewed in the rotating direction of the accumulating wheel and the front conveying passage as viewed in the rotating direction of the accumulating wheel in accordance with the results of discrimination of the obverse and reverse sides, and are fed into the space formed between the blades in the rear and front portions of the accumulating wheel as viewed in the rotating direction thereof, and that, in the front conveying passage as viewed in the rotating direction of the accumulating wheel, bills or the like are conveyed with their front and rear ends inverted by the inverting/conveying passage capable of advancing and retracting which is formed by a pair of reversible conveyors. Accordingly, unlike in the case of a conventional apparatus in which a bill or the like is inverted after the bill or the like is set in a free state, an apparatus according to the present invention makes it possible to effect the inverting operation of bills or the like positively, and the time for inverting operation becomes definite. Therefore, the feeding out of bills onto the accumulating wheel can be effected smoothly, and there is no time lag in feeding-out timing. Hence, it is possible to overcome the occurrence of such malfunctionings as bills or the like from the two conveying passages for the obverse and reverse sides being double fed into the same space between the blades of the accumulating wheel, or succeeding bills or the like being double fed onto the conveying passage on the inverting side.

In addition, since bills or the like with low rigidity in which the aforementioned malfunctionings are particularly liable to occur can be handled smoothly, the range of bills or the like that can be handled is advantageously increased.

Furthermore, since the speed of the conveying operation on the inverting side and the inverting operation can be increased due to the positive inverting operation, and since the conveying time including that for the inverting operation on the inverting side is definite, it is possible to effect a handling for conveying bills with their obverse and reverse sides in the mixed state onto the carrying-in passage at short fixed intervals without any substantial loss in time. Accordingly, when handling a fixed number of bills, it is possible to effect without prolongation a handling within a fixed, required handling time which does not change in dependence upon the proportions of the obverse and reverse sides.

What is claimed is:

1. An apparatus for arranging the obverse and reverse sides of bills comprising: a carrying-in passage for carrying in bills with their obverse and reverse sides in the mixed state; an accumulating wheel having a plurality of blades on the peripheral portion thereof so as to feed out sent-in bills by rotating while accommodating the same in between said blades; a rear conveying passage as viewed in the rotating direction of said accumulating wheel which communicates with the rear portion of said accumulating wheel, as viewed in the rotating direction of said accumulating wheel, from the outlet of said carrying-in passage; a front conveying passage as viewed in the rotating direction of the accumulating wheel which is communicated with the front portion of the periphery of said accumulating wheel, as viewed in the rotating direction, from the same outlet as that of said carrying-in passage; and a distributing device located in the vicinity of the outlet of said carrying-in passage so as to distribute bills from said carrying-in passage into said rear conveying passage as viewed in the rotating direction of the accumulating wheel and said front conveying passage as viewed in the rotating direction of the accumulating wheel depending on the condition of their obverse and reverse sides, said front conveying passage as viewed in the rotating direction of the accumulating wheel being formed by: a front-stage conveying passage communicating with the outlet of said carrying-in passage; an inverting/conveying passage formed by a pair of reversibly rotating conveyors so as to carry out bills from said front-stage conveying passage through a carrying-in/out port after once receiving the same from said carrying-in/out port and returning the same; and a rear-stage conveying passage one end of which faces said carrying-in/out port of said inverting/conveying passage and the other end of which faces the front portion of said accumulating wheel as viewed in the rotating direction thereof.

* * * * *